Aug. 25, 1964 R. E. SCOVEL ET AL 3,145,937
APPARATUS FOR CONVEYING AND SEPARATING MATERIAL
Original Filed Aug. 4, 1958 6 Sheets-Sheet 2
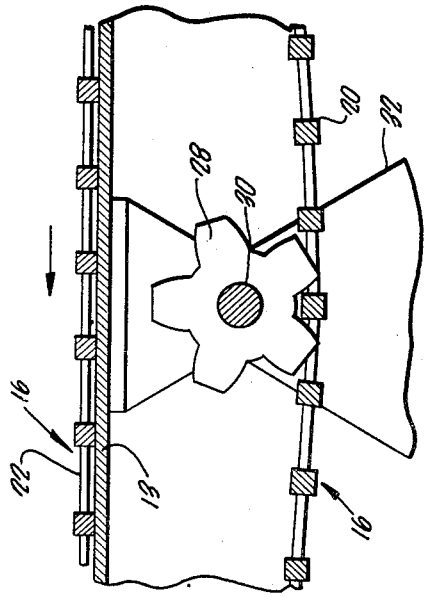
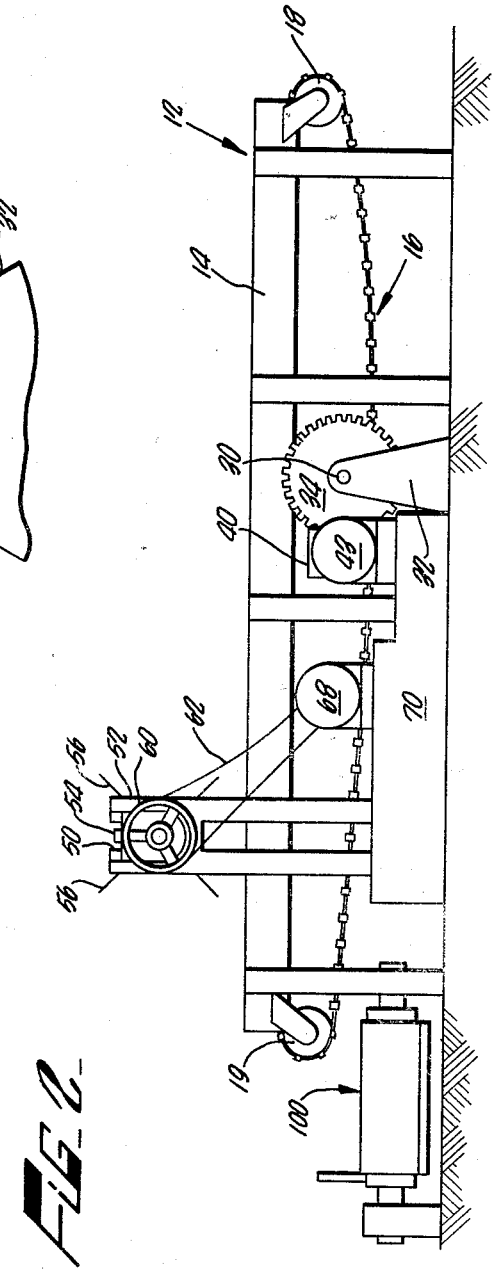
INVENTORS.
RALPH E. SCOVEL
BENJAMIN G. PETRUCCI
BY
Christie, Parker & Hale
ATTORNEYS.

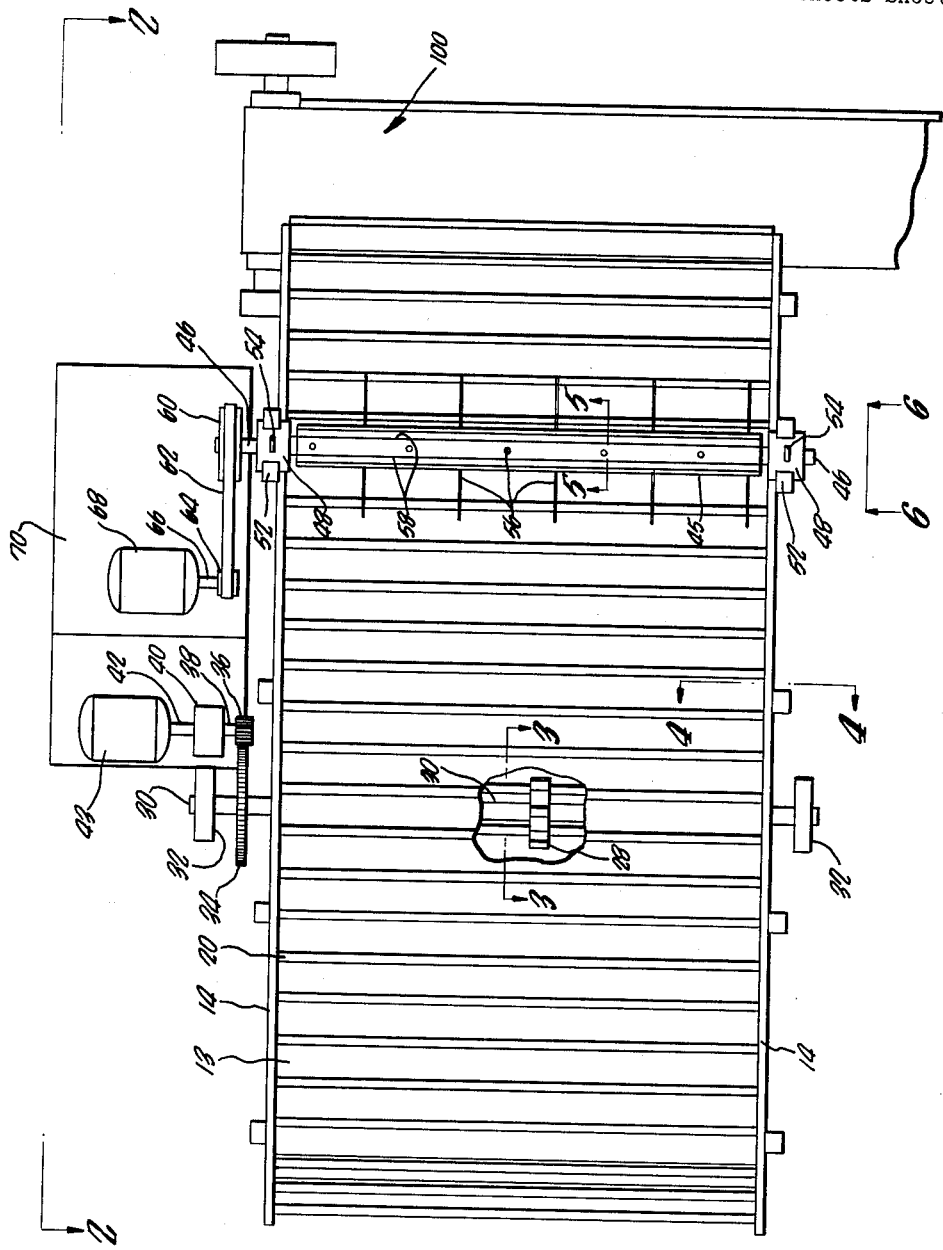

Aug. 25, 1964   R. E. SCOVEL ET AL   3,145,937
APPARATUS FOR CONVEYING AND SEPARATING MATERIAL
Original Filed Aug. 4, 1958   6 Sheets-Sheet 3
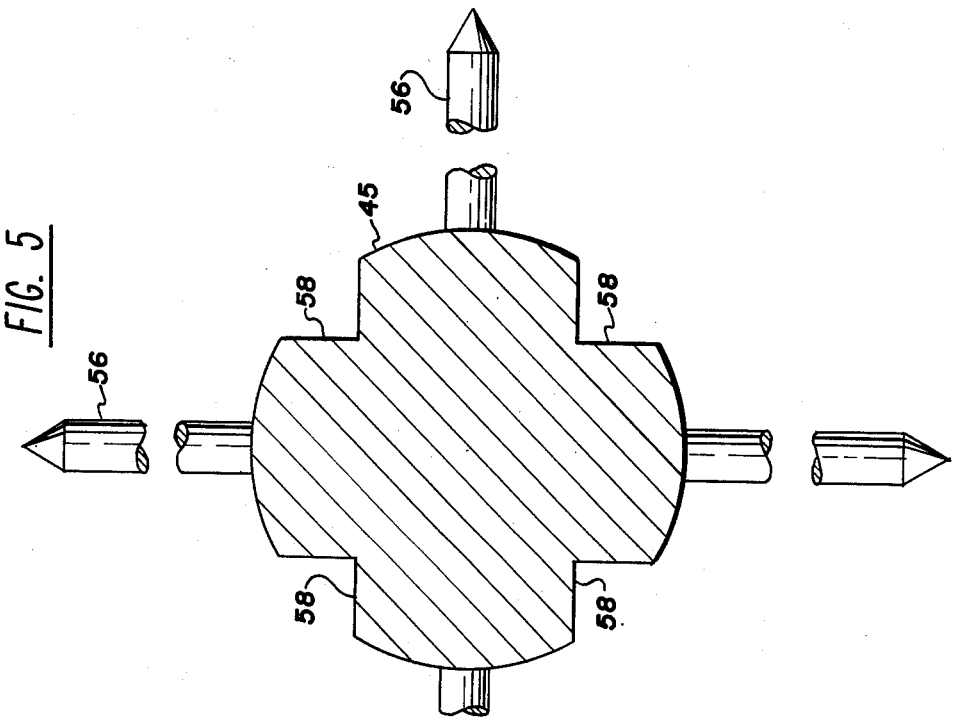
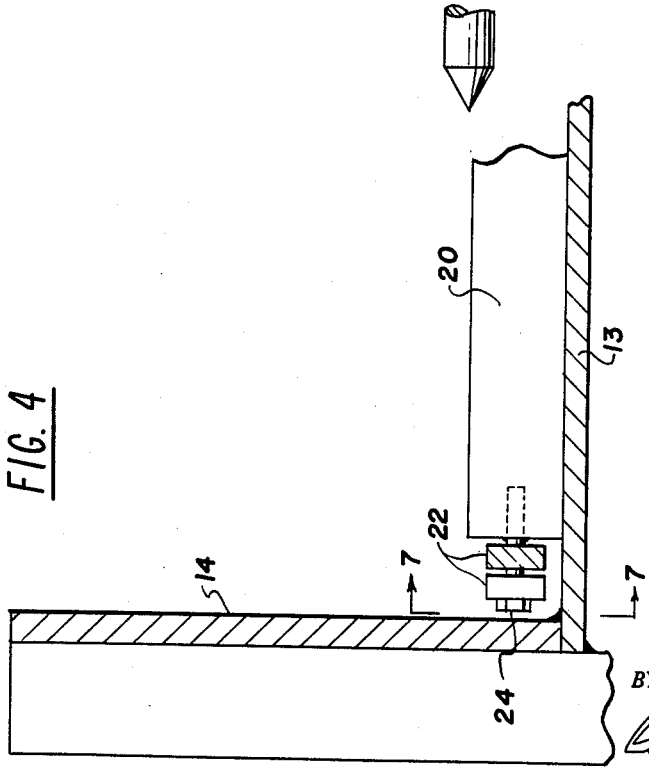
INVENTORS.
RALPH E. SCOVEL
BY BENJAMIN G. PETRUCCI
ATTORNEYS.

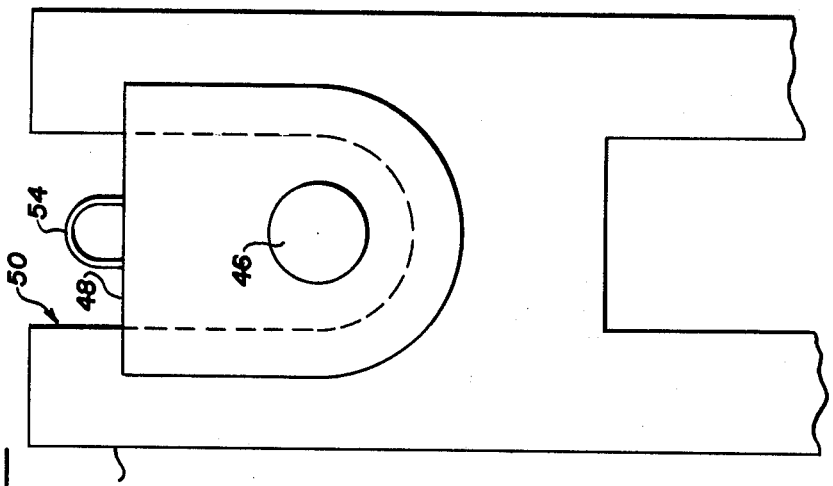
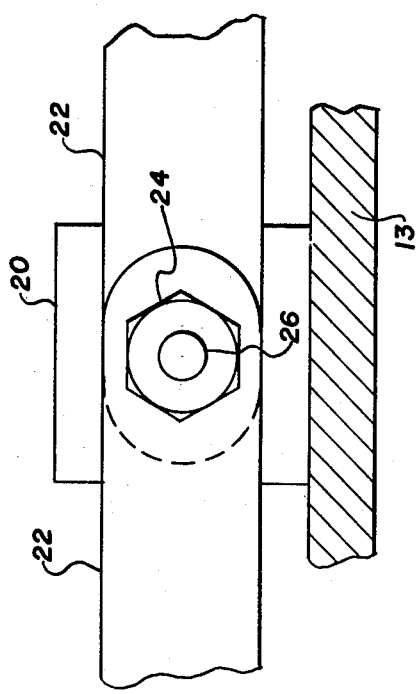

Aug. 25, 1964 R. E. SCOVEL ET AL 3,145,937
APPARATUS FOR CONVEYING AND SEPARATING MATERIAL
Original Filed Aug. 4, 1958 6 Sheets-Sheet 5
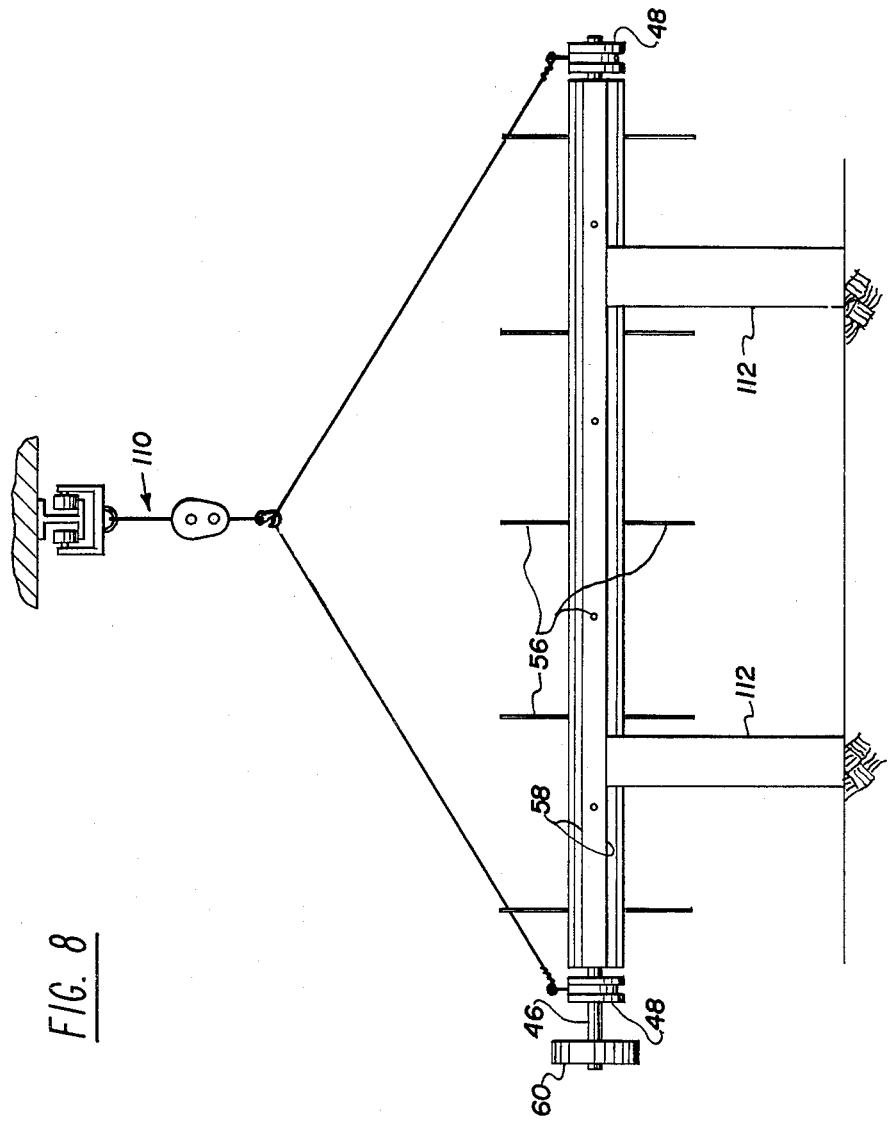
INVENTORS.
RALPH E. SCOVEL
BY BENJAMIN G. PETRUCCI
Christie, Parker & Hale
ATTORNEYS.

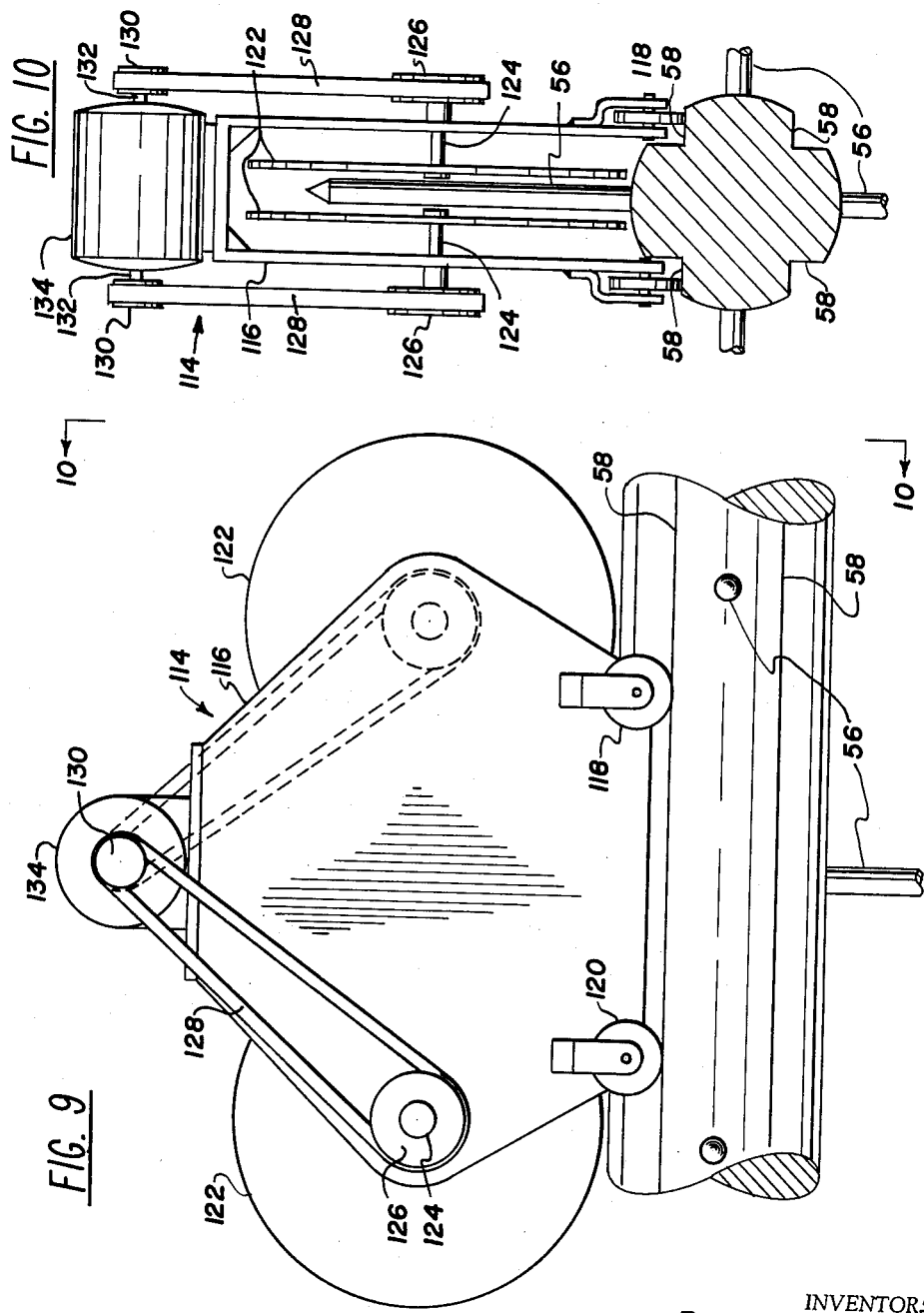

3,145,937
APPARATUS FOR CONVEYING AND SEPARATING MATERIAL

Ralph E. Scovel, Shingle Springs, and Benjamin G. Petrucci, Sacramento, Calif., assignors to Dano of America, Inc., Sacramento, Calif., a corporation of California
Continuation of application Ser. No. 752,818, Aug. 4, 1958. This application July 3, 1961, Ser. No. 125,026
5 Claims. (Cl. 241—101)

This invention relates to apparatus for conveying material such as the loose mass of solids found in typical municipal refuse, and is a continuation of our copending application Serial No. 752,818, filed August 4, 1958, now abandoned.

Although the apparatus of the invention can be used for conveying practically any loosely conglomerated solid material, it is particularly useful for handling municipal refuse in conjunction with the composting operation described and claimed in our copending application Serial No. 737,885, filed May 26, 1958.

In copending application Serial No. 737,885, there is disclosed apparatus for composting municipal refuse in an elongated cylinder or tube which is slowly rotated about a horizontal axis. Refuse is added to one end of the tube, and a day or so later, compost is removed from the other end of the tube. Thus, the process is a more or less continuous throughput operation.

Economic handling of municipal refuse for composting is complicated by the wide variety of materials found in the refuse, and the more or less batchwise delivery of the refuse by trucks to the composting site. A typical municipal refuse includes not only the ordinary garbage, paper, cardboard and rags, but also includes many non-compostable items such as furniture, tires, water heaters, bed springs, tin cans, and even occasional automobile transmissions and differentials. Many of these large non-compostable items must be removed by hand. Tin cans and other ferrous metals are usually removed by electromagnets. However, segregation of the ferrous articles is often complicated by the fact that the average housewife fills containers, such as paper sacks or cardboard boxes, with a mixture of paper, garbage and tin cans. Thus, when the containers pass through the electromagnetic separator, they and all their contents of garbage and paper are picked up with the tin cans by the electromagnets, thereby resulting in an inefficient separation of the ferrous articles from the non-ferrous.

This invention provides apparatus to insure a substantially uniform feed rate of refuse into the inlet end of the composting operation. In addition, the apparatus rips apart paper bags and other containers so that any ferrous metal in them can be easily and completely segregated from the remainder of the refuse by the electromagnets. The apparatus also automatically picks rags from the refuse. The recovery of the rags, which have a substantial salvage value, reduces the net cost of the composting operation.

Briefly, the invention contemplates apparatus for conveying a loose mass of solid materials comprising a conveyor on which the material is carried. Means are provided for driving the conveyor so that material on it is carried from one point to another. An elongated drum is disposed over the conveyor to extend transversely to the direction of the conveyor movement. A plurality of longitudinally spaced and outwardly extending spikes are mounted on the drum, and means are provided for rotating the drum to move the spikes through material on the conveyor so the material is distributed more uniformly on the conveyor. The spikes also rip apart containers which might have ferrous articles trapped in them.

Wires, rags, and the like become wrapped around the drum and must be removed periodically to prevent plugging of the spikes and jamming of material on the conveyor. Accordingly, the spikes are arranged in longitudinal rows, and an elongated longitudinal groove is formed between at least one adjacent pair of rows of spikes. A cutting means includes a guide wheel, a frame carried by the guide wheel, and a cutting wheel carried by the frame, so that the guide wheel is adapted and shaped to fit into the groove on the drum. Means are provided for moving the cutting means along the groove to cut away wires, rags, and the like which have become wrapped around the drum.

These and other aspects of the invention will be more fully understood from the following detailed description taken in conjunction with the accompanying drawings in which:

FIG. 1 is a plan view of the presently preferred embodiment of the invention;
FIG. 2 is a side elevation taken on line 2—2 of FIG. 1;
FIG. 3 is a view taken on line 3—3 of FIG. 1;
FIG. 4 is a view taken on line 4—4 of FIG. 1;
FIG. 5 is a view taken on line 5—5 of FIG. 1;
FIG. 6 is a view taken on line 6—6 of FIG. 1;
FIG. 7 is a view taken on line 7—7 of FIG. 4;
FIG. 8 is a side elevational view of one of the drums removed from the conveyor apparatus and suspended by a chain hoist over a support;
FIG. 9 is a side view of a cutting machine adapted to move longitudinally along the drum and cut away collected rags and other debris; and
FIG. 10 is a view taken on line 10—10 of FIG. 9.

Referring to FIGS. 1 and 2, the invention includes an elongated rectangular box or bed 12 having a bottom 13 (see FIG. 4), a pair of side walls 14, and being open at each end. An endless conveyor 16 is disposed over the bed bottom and adopted to move from right to left, as viewed in FIGS. 1, 2, and 3. The conveyor is disposed around a first idler roller 18 at the right end of the bed, and around a second idler roller 19 at the left end of the bed. The rollers are horizontal, parallel, and extend substantially across the width of the bed. The conveyor includes a plurality of elongated bars 20 disposed to extend across the bed from side wall to side wall. The bars are laterally spaced from each other and connected together by a series of overlapping links 22 secured together by bolts 24 which are located in matching bores 26 in opposite ends of the links. Each bolt is welded at its respective inner end to a respective bar. The conveyor is driven by driving gear 28 which engages the lower length of the endless conveyor. Driving gear 28 is mounted on the center of a horizontal shaft 30 which extends across the bottom of the bed and is journalled in a bearing 32. A relatively large intermediate gear 34 is mounted near one end of the shaft 30 and is driven by a pinion gear 36 connected to the outer end of an output drive shaft 38 of a gear reduction box 40, which has an input drive shaft 42 driven by an electric motor 43. Thus, when the electric motor 43 is turned on, the conveyor is driven so that its upper length is moved from right to left across the bottom of the bed, in effect providing a "live bottom" for the bed. Garbage, refuse, or other material is dumped from trucks on to the right hand end of the conveyor.

An elongated and rotatable drum 45 is disposed near the left hand end of the conveyor to extend across substantially the entire width of the conveyor and be spaced a substantial distance above the conveyor. The opposite ends of the drum are supported on respective shafts 46 journalled in bearings 48. Each bearing 48 is I-shaped in cross section as viewed from above in FIG. 1 and makes a sliding fit down into an upwardly opening U- shaped groove 50 at the upper end of a respective support 52 at each end of the drum. A separate pad eye 54 is welded to the upper side of each of the bearings 48 so that the drum can readily be lifted from the supports 52.

A plurality of radially extending spikes 56 are attached at their inner ends at longitudinally spaced locations to the exterior of the drum, and as shown in FIGURES 1, 2, 5 and 8 in the preferred form, are arranged in parallel rows, the rows being disposed at equal radially spaced intervals. As shown most clearly in FIG. 5, the outer ends of the spikes are pointed. The spikes can have many different shapes, including that of sharp knives. Also, as shown most clearly in FIG. 5, the drum has four longitudinal grooves 58 which may be referred to as drum surface guides formed in its exterior surface at equal radially spaced intervals, each groove 58 being parallel to adjacent rows of spikes 56. The purpose of these grooves is described below in connection with FIGS. 8 through 10. A pulley 60 is mounted on one of the drum shafts outboard of one of the drum bearings and is powered by a belt 62 disposed over a drive pulley 64 on a shaft 66 of a first drum motor 68 mounted on a foundation 70.

An endless transfer belt 100 is disposed under the left end of the primary conveyor and runs in a direction perpendicular to the direction in which the primary conveyor runs. The transfer belt runs under an electromagnet (not shown) which separates ferrous articles from the incoming refuse. After passing the electromagnet, the refuse is carried into the composting digestor tube (not shown) where it is composted as described in copending application Serial No. 737,885.

The operation of the conveyor of this invention is relatively simple. Refuse is dumped onto the right (as viewed in FIG. 2) end of the conveyor, and the conveyor motor is turned on so that the live bottom moves from right to left as viewed in FIG. 2 to carry refuse toward the drum. The drum motor is turned on so that the drum is rotated in a counterclockwise direction as viewed in FIG. 2. As the refuse moves under the rotating drum, the spikes 56 sweep through the refuse and tend to carry it back to the right as viewed in FIG. 2. Thus, the refuse is subjected to a raking and leveling operation by the drum. At the same time paper bags and other containers which may be present are torn and ripped apart. Also, rags, wire and other similar articles are picked up by the spikes and wrapped around the drum.

After passing the drum, the refuse on the primary conveyor is relatively level and uniform and therefore drops onto the transfer belt at a fairly constant rate. In addition, the refuse is broken up so that paper bags, cardboard cartons and boxes, etc., are torn and shredded to permit any ferrous metals within them to be easily picked up by the electromagnet without also picking up garbage and other matter which might have been in the containers. The second rotating drum also picks from the refuse rags and the like which are wrapped around the drum.

The drum motor and the conveyor motor can be run in either direction and at different speeds. Ordinarily, the conveyor motor is run so that refuse is carried from the right to the left as viewed in FIG. 2. The drum motor is run so that the drum is rotated counterclockwise as viewed in FIG. 2 and at substantially the same speed.

Whenever the drum becomes clogged or loaded with rags or other material, this material may be removed by hand for salvage purposes, but preferably the drum is lifted from its support by a chain hoist 110 as shown in FIG. 8 and set on a pair of stationary blocks 112. The drive belt is slipped off of the pulley on the drum shaft so the drum can be lifted. The material is cut off of the drum by cutting tool 114 shown in FIGS. 9 and 10. The cutting tool includes a U-shaped frame 116 open at its bottom. A forward pair of wheels 118 which may be referred to as guide wheels and a rear pair of wheels 120 which may also be referred to as guide wheels are mounted on the lower edge of the frame 116 and are adapted to ride in a pair of longitudinal notches 58 on the drum. A pair of parallel and laterally spaced cutting wheels 122 are mounted within the frame 116 to be longitudinally displaced from each other. Each cutting wheel is mounted on a respective shaft 124 which is journalled through the frame and has on its outer end a pulley 126. Each pulley 126 is driven by a respective drive belt 128 mounted around respective drive pulleys 130 on opposite ends of a shaft 132 extending through a cutter motor 134 mounted on the upper end of the U-shaped frame 116.

The operation of the cutter to clean the drum is as follows:

The cutter motor is turned on so that the cutter blades are rotated at a relatively high speed. The blades can be either saw-toothed type or can be cutting wheels impregnated at their peripheries with industrial diamonds. The wheels of the cutter frame are set in a pair of longitudinal grooves of the drum as shown in FIG. 10, and then the cutter is pushed along the length of the drum so that it cuts away rags, wires, etc., as it is moved. The cutter is then removed and the drum rotated 90° from the position shown in FIG. 10, and the above cutting procedure repeated, so that the material on the drum is cut into four approximately equal segments and readily drops from or is easily pulled off the drum. The drum is then either replaced as shown in FIGS. 1 and 2, or else is held in a standby condition, having been previously replaced by a spare drum to permit continuous operation of the primary conveyor.

From the above explanation, it will be apparent that the conveyor of this invention automatically conditions materials such as municipal refuse for mechanical handling in composting equipment, and reduces the amount of hand labor previously required. By having the drums over the primary conveyor rotate in a counterclockwise direction as viewed in FIG. 2, material which is not readily broken up is continually rejected and thrown back toward the right hand end of the conveyor, where it may easily be removed by hand. Should any heavy or large object or mass get under the drums, and tend to overload them, any damage to the equipment is avoided due to the fact that the drums are free to "float" upwardly in their respective supports, the drive belts being sufficiently loose and flexible to permit a substantial amount of vertical displacement.

We claim:

1. Apparatus for conveying a loose mass of solid materials including wires, rags, and the like, the apparatus comprising a conveyor on which the material is carried, means for driving the conveyor so that material on it is carried from a first point to a second point, an elongated drum disposed over the conveyor to extend transversely to the direction of conveyor movement, the drum surface defining an elongated groove, a plurality of longitudinally spaced and outwardly extending spikes arranged in a continuous row across the surface of the drum, the groove being disposed adjacent and parallel to the row of spikes, means for rotating the drum to move the spikes through material on the conveyor, cutting means comprising a guide wheel, a frame carried by the guide wheel, and a cutting wheel carried by the frame, the guide wheel being shaped to fit into the groove, and means for moving the cutting means along the groove to cut away wires, rags, and the like which have become wrapped around the drum.

2. Apparatus for conveying a loose mass of solid materials including wires, rags, and the like, the apparatus comprising a conveyor on which the material is carried, means for driving the conveyor so that material on it is carried from a first point to a second point, an elongated drum disposed over the conveyor to extend transversely to the direction of conveyor movement, the drum surface defining a plurality of elongated grooves, a plurality of longitudinally spaced and outwardly extending spikes arranged in a plurality of rows across the surface of the drum, one elongated groove being disposed adjacent and parallel to each row of spikes, means for rotating the drum to move the spikes through material on the conveyor, cutting means comprising a plurality of guide wheels, a frame carried by the guide wheels, a plurality of cutting wheels carried by the frame, the guide wheels being each shaped to fit into a groove, and means for moving the frame with the guide wheels each riding in a groove to cut away wires, rags, and the like which have become wrapped around the drum.

3. Apparatus for conveying a loose mass of solid materials, including wires, rags, and the like, comprising a conveyor on which the material is carried, means for driving the conveyor so that material on it is carried from a first point to a second point, an elongated drum disposed over the conveyor to extend transversely to the direction of conveyor movement, a plurality of longitudinally spaced and outwardly extending spikes carried by the drum and disposed in a plurality of parallel longitudinal rows across the surface of the drum, the rows being equally spaced radially around the surface of the drum, the drum surface defining a plurality of longitudinal drum surface guides, there being at least one longitudinal drum surface guide disposed adjacent and parallel to each longitudinal row of spikes, means for rotating the drum to move the spikes through material on the conveyor, cutting means comprising a plurality of pairs of guide wheels adapted to ride along the drum surface guides, the guide wheels of each pair being laterally separated by the same distance as that separating adjacent longitudinal drum surface guides on the drum surface, a frame carried by the guide wheels, a pair of cutting wheels carried by the frame and disposed laterally from one another by a distance at least greater than the width of each of the rows of spikes on the drum, and arranged within the frame so that as the frame is rolled across the drum surface with the guide wheels riding along a pair of adjacent drum surface guides, each cutting wheel will be disposed on the opposite side of the adjacent row of spikes from the other cutting wheel, means for causing the cutting wheels to rotate, and means for moving the cutting means along a pair of adjacent drum surface guides to cut away wires, rags, and the like which have become wrapped around the drum.

4. Apparatus according to claim 3 in which the drum surface guides comprise grooves defined by the surface of the drum.

5. A drum for use with material handling apparatus of the class wherein loose masses of solid materials including wires, rags, and the like, are carried by a conveyor past a rotating drum to be separated, broken up, and leveled, the apparatus including also a traveling cutter mechanism carrying cutting means and arranged to roll on guide wheels for cutting off wires, rags, and the like which have become wrapped around the drum, comprising: a cylinder disposed transversely to the path of movement of the solid material, the cylinder being of sufficient length to extend substantially across the conveyor, a plurality of longitudinally spaced and outwardly extending spikes attached to the cylinder and arranged along a plurality of parallel and equidistant rows, each row commencing at one end of the cylinder and terminating at the opposite end of the cylinder, a plurality of drum surface guides defined by the surface of the cylinder and shaped to receive and guide the guide wheels of the cutter mechanism, one drum surface guide being disposed adjacent to each row of spikes and parallel thereto, the distances between all drum surface guides and their adjacent rows of spikes being equal and being of sufficient length with reference to the location of the cutting means in the cutter mechanism that as the cutter mechanism is rolled on its guide wheels along the drum surface guides the cutting device will be held away from the spikes.

References Cited in the file of this patent
UNITED STATES PATENTS

| | | |
|---|---|---|
| 1,730,560 | Castricum | Oct. 8, 1929 |
| 2,503,353 | Pugh | Apr. 11, 1950 |
| 2,610,389 | Bungay | Sept. 16, 1952 |